Patented Oct. 23, 1945

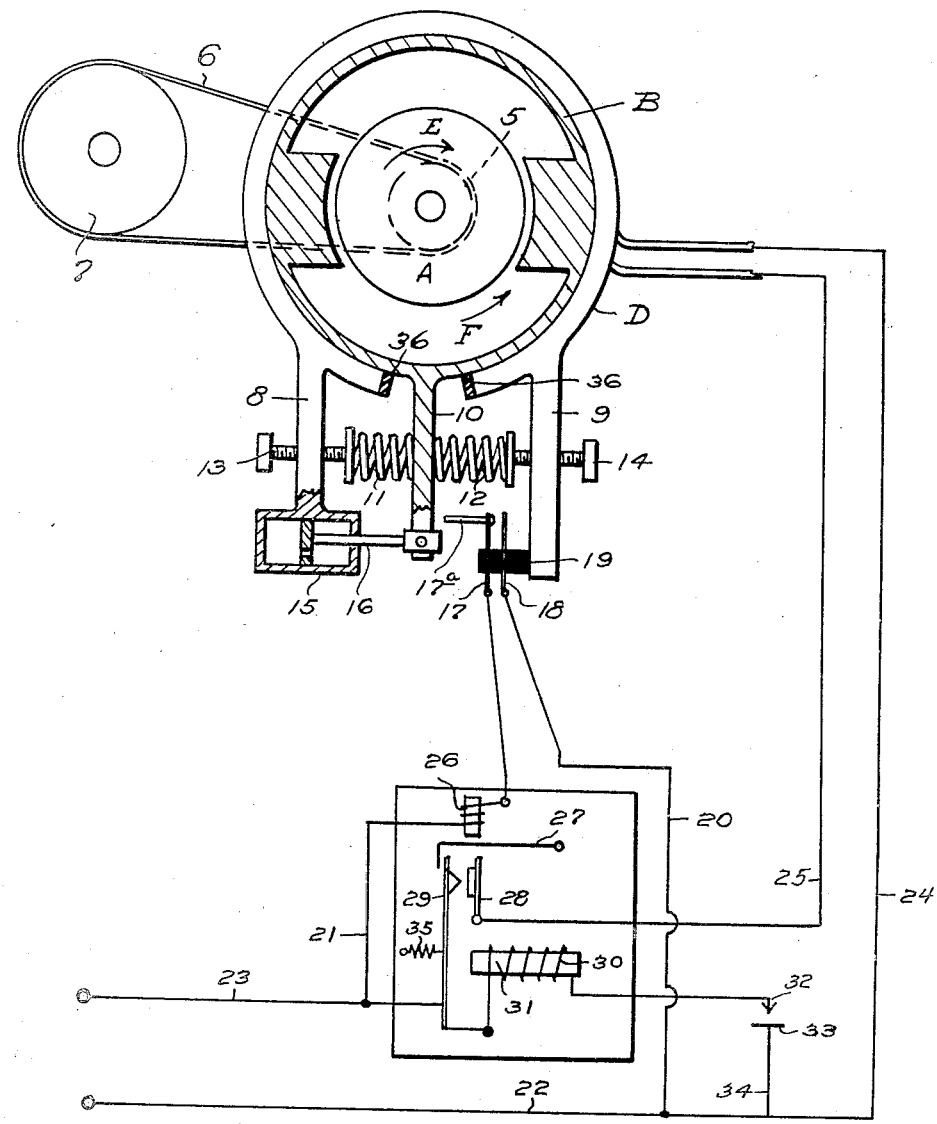

2,387,533

UNITED STATES PATENT OFFICE 2,387,533

TORQUE CONTROLLED ELECTRIC MOTOR

Earl T. Schmucker, Rapid City, S. Dak.

Application September 11, 1944, Serial No. 553,589

5 Claims. (Cl. 172—36)

The object of the present invention is to provide a torque controlled electric motor which can be used to drive any other machine without any special connections between the motor and such machine.

It is a further object of the invention to provide a torque controlled electric motor comprising but a very few and extremely simple and economical parts built directly into the motor in such manner as to make the whole self-contained.

It is a further object of the invention to provide a torque controlled electric motor in which the control elements, while being of a very simple and inexpensive nature are so correlated and arranged that the whole is nicely balanced, with the result that a very quiet and smoothly operating structure is had.

Further objects and advantages of the invention will be set forth in the detailed description which follows.

The figure shown in the accompanying drawing is a diagrammatic view illustrating the application of the invention, the stator of the motor being illustrated in section.

In the drawing A designates the rotor or armature which may drive through a pulley 5, and a belt 6, to any other machine constituting the load at 7, and the stator or field carrying element B of circular form to adapt it to be mounted for slight oscillatory movement in the casing D. This casing is provided with a pair of spaced, depending legs 8 and 9. A depending leg 10 lies between the legs 8 and 9 and is carried by the stator B. Springs 11 and 12 bear respectively between the heads of screws 13 and 14 and the leg 10, said screws being threaded for adjustment through the legs 8 and 9 to thereby vary the tension of the springs. The leg 8, in addition to serving as a carrier for the screw 13, is caused to serve as a carrier for the cylinder of a dash-pot 15. The plunger 16 of this dash-pot is connected to the lower end of the leg 10. The leg 9, in addition to serving as a carrier for the screw 14, serves as a carrier for a switch comprising the two contact strips 17 and 18 which are mounted in the insulating block 19. The strips 17 and 18 are connected by the leads 20 and 21 to the lines 22 and 23 which constitute the current supply for the motor, the motor leads being indicated at 24 and 25. The lead 21 includes a winding about a core 26 which, when energized, lifts a latch 27. The current supply to the motor includes the main contacts 28 and 29 which, during the operation of the motor, are held closed by the latch 27. The contact 29 is connected to a coil 30 which is wound about a core 31 and is connected to one of the terminals 32 of an operator's switch, the other terminal of said switch being indicated at 33 and being connected at 34 to the side 22 of the supply line.

The operation of the device is as follows: When the motor is to be set in operation, the operator closes the operator's switch at 32—33. This energizes core 31 and causes it to move contact 29 into engagement with contact 28 against the tension of spring 35. Latch 27 then drops and holds the main contacts 28 and 29 into engagement with each other. This completes the circuit to the motor and the motor continues to operate until latch 27 is lifted manually or the load at 7 exceeds the load for which the spring 12 has been set by the adjustment of screw 14. If the rotor be rotated in the direction of the arrow E overload at 7 will cause the stator to move slightly in the opposite direction or in the direction of the arrow F. This will cause the leg 10 to act upon the projection 17ª of contact 17 to close the contacts 17 and 18. This energizes core 26, lifts latch 27 and permits spring 35 to move contact 29 away from contact 28, thus cutting off current to the motor. If it be desired to continue the motor in operation even in the face of an overload, this can be accomplished by having the operator hold the switch constituted by the parts 32—33 in closed position. When this is done the core 31 will hold the main contacts closed even without the latch, it being understood that the operator's switch is a mere push button switch which is closed only as long as it is held closed after the manner of an ordinary doorbell switch. By mounting the leg 10 between the springs 11 and 12, the leg is normally held in the centralized position shown and a nicely balanced and smoothly operating structure is the result. Suitable stops may be provided for limiting the throw of the leg 10. These may constitute merely rubber bumpers at 36. It is apparent that the arrangement constituted by contacts 17, 18 and their associated parts may be duplicated upon the opposite sides of leg 10, if it be desired to torque control the rotation of the motor in the opposite direction. While I have illustrated the electrical connections shown in the drawing, it is to be understood that these may be varied in many ways, the invention residing more particularly in the very simple, compact and economical arrangement by which increase of torque beyond a predetermined degree is utilized to control the current supplied to the motor. A switch S may be provided to stop the motor independently of the torque control. It is to be understood that the invention is not limited to the precise construction set forth but that it includes within its purview whatever changes fairly come within either the terms or the spirit of the appended claims.

Having described my invention, what I claim is:

1. An electric motor comprising a rotor, a stator and a case, means for mounting said stator for limited oscillation in the case, a leg projecting from the case, a leg projecting from the stator, an adjustable means carried by the leg of the case and movable toward and from the leg of the stator and a spring disposed between said adjustable means and the leg of the stator.

2. In an electric motor comprising a rotor, a stator and a case, means for mounting the stator for limited turning movement in the case, a leg projecting radially from the stator through an opening of the case, a pair of legs carried by the case, one upon each side of the leg of the stator, a spring upon each side of the leg of the stator and adjusting screws threaded for adjustment through the legs of the case and bearing upon the springs to adjustably vary the tension of said springs.

3. In an electric motor comprising a rotor, a stator and a case, means for mounting the stator for limited turning movement in the case, a leg projecting radially from the stator through an opening in the case, a pair of legs carried by the case, one upon each side of the leg of the stator, a spring upon each side of the leg of the stator and adjusting screws threaded for adjustment through the legs of the case and bearing upon the springs to adjustably vary the tension of said springs, and a dash-pot cylinder carried by one of the legs of the case, the plunger of said dash-pot being pivotally connected to the lower end of the leg of the stator.

4. In an electric motor comprising a rotor, a stator and a case, means for mounting the stator for limited turning movement in the case, a leg projecting radially from the stator through an opening of the case, a pair of legs carried by the case, one upon each side of the leg of the stator, a spring upon each side of the leg of the stator and adjusting screws threaded for adjustment through the legs of the case and bearing upon the springs to adjustably vary the tension of said springs, electric contact elements mounted upon the lower ends of one of the legs of the case and comprising means disposed in the path of movement of the leg of the stator to effect movement of said contacts under the influence of the movement of the stator.

5. In an electric motor comprising a rotor, a stator and a case, means for mounting the stator for limited turning movement in the case, a leg projecting radially from the stator through an opening of the case, a pair of legs carried by the case, one upon each side of the leg of the stator, a spring upon each side of the leg of the stator and adjusting screws threaded for adjustment through the legs of the case and bearing upon the springs to adjustably vary the tension of said springs, electric contact elements mounted upon the lower ends of one of the legs of the case and comprising means disposed in the path of movement of the leg of the stator to effect movement of said contacts under the influence of the movement of the stator, and a dash-pot mounted upon the lower end of the other leg of the case, the plunger of said dash-pot being pivotally connected to the lower end of the leg of the stator.

EARL T. SCHMUCKER.